United States Patent [19]

Kawano et al.

[11] Patent Number: 4,848,212
[45] Date of Patent: Jul. 18, 1989

[54] INTERNAL COMBUSTION ENGINE PISTON WITH TWO COMPRESSION RINGS HAVING REDUCED OIL CONSUMPTION

[75] Inventors: Tamenori Kawano; Atsushi Nakazawa, both of Higashi-Hiroshima; Kiyomi Sumida, Kamo; Takasi Nagano, Uto, all of Japan

[73] Assignee: Mazda Motor Corporation, Hiroshima, Japan

[21] Appl. No.: 42,354

[22] Filed: Apr. 24, 1987

[30] Foreign Application Priority Data

Apr. 24, 1986 [JP] Japan .................................. 61-95488
Apr. 24, 1986 [JP] Japan .................................. 61-95489

[51] Int. Cl.⁴ ............................ F16J 9/14; F02F 5/00
[52] U.S. Cl. ...................................... 92/158; 277/221; 277/222; 123/193 P
[58] Field of Search .............. 123/193 P; 92/208, 227, 92/242, 246, 158–160; 277/216, 220, 221, 222

[56] References Cited

U.S. PATENT DOCUMENTS

| | | | |
|---|---|---|---|
| 2,653,065 | 9/1953 | Appleton | 92/160 X |
| 3,494,262 | 2/1970 | Holcombe | 92/160 X |
| 4,111,438 | 9/1978 | Longfoot | 277/216 X |
| 4,189,161 | 2/1980 | Grimm | 277/221 |
| 4,361,337 | 11/1982 | Montes | 277/221 |
| 4,362,136 | 12/1982 | Lipp | 123/193 P |
| 4,475,739 | 10/1984 | Nakajima et al. | 277/216 |
| 4,575,107 | 3/1986 | Umegawa | 277/221 |

FOREIGN PATENT DOCUMENTS

| | | | |
|---|---|---|---|
| 694688 | 7/1940 | Fed. Rep. of Germany | 277/222 |
| 1800264 | 8/1969 | Fed. Rep. of Germany | 277/216 |
| 65210 | 5/1979 | Japan | 277/216 |
| 59-65958 | 5/1984 | Japan | |
| 59-126158 | 8/1984 | Japan | |
| 98010 | 10/1980 | PCT Int'l Appl. | 277/220 |
| 254062 | 12/1944 | Switzerland | 92/227 |

OTHER PUBLICATIONS

Furuhama, S. et al. "Axial Movement of Piston Rings in the Groove", in ASLE Transactions, vol. 15, No. 4, pp. 278-287 (1972).

*Primary Examiner*—Robert E. Garrett
*Assistant Examiner*—George Kapsalas
*Attorney, Agent, or Firm*—Wenderoth, Lind & Ponack

[57] ABSTRACT

In a reciprocating piston engine, the piston has a top ring and a second ring received in respective ring grooves. The top ring has two end surfaces defining therebetween a gap the open area of which on the side of the combustion chamber, when the top ring abuts against the upper surface of the ring groove, is smaller than an open area of the gap facing a second land clearance when the top ring seats on the lower surface of the ring groove. As the top ring seats on the lower surface of the ring groove during the power stroke when the engine is operated at a high-speed, high-loaded condition, the greater open area of the gap rapidly introduces the combustion pressure into the second land clearance to thereby reduce oil consumption. When the engine works at a low-speed, low-loaded condition, the top ring abuts against the upper surface of the ring groove during the intake and compression strokes, where the smaller open area of the gap reduces the flow of oil from the crankcase to the combustion chamber.

15 Claims, 7 Drawing Sheets

FIG. 3
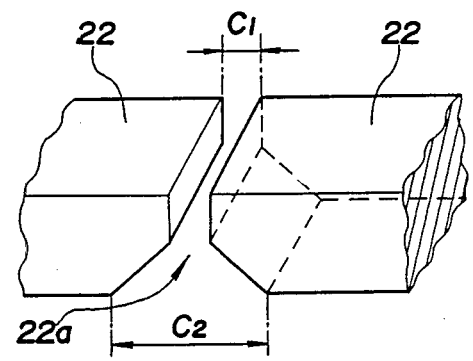
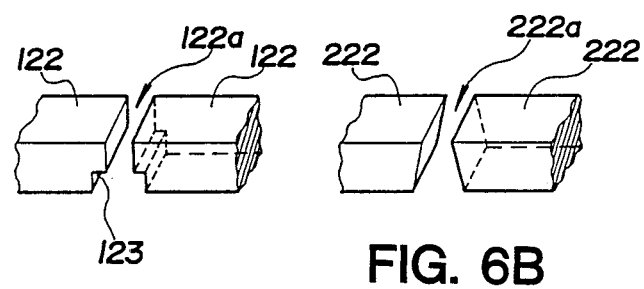
FIG. 6A          FIG. 6B

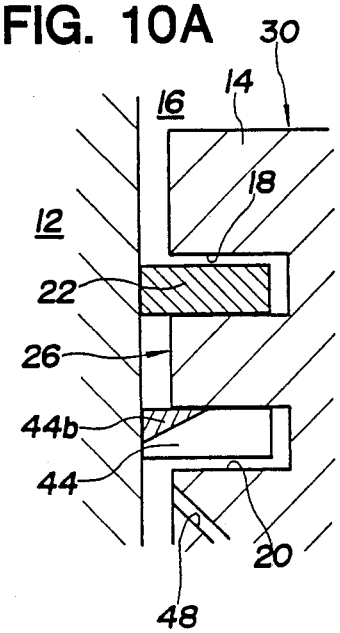
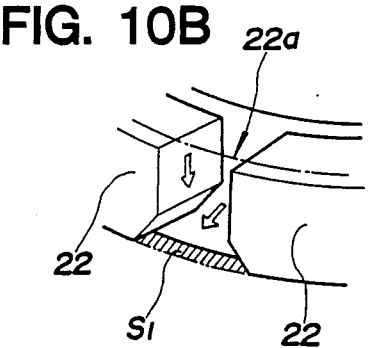
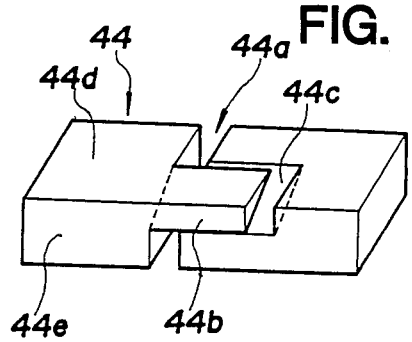
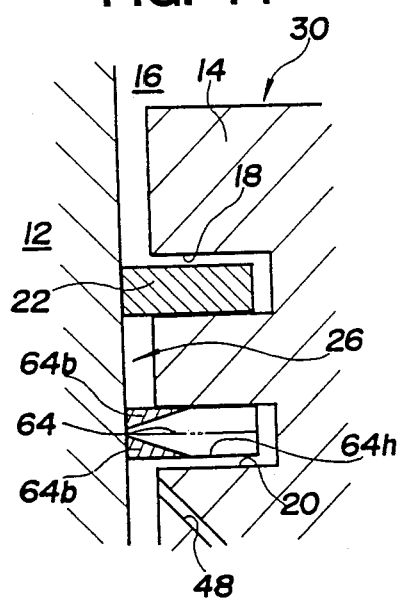

INTERNAL COMBUSTION ENGINE PISTON WITH TWO COMPRESSION RINGS HAVING REDUCED OIL CONSUMPTION

BACKGROUND OF THE INVENTION

1. Field of the Invention

This invention relates to a reciprocating piston engine and, more particularly, to a piston engine with two piston rings, namely top and second compression rings.

2. Description of the Prior Art

A typical piston of an internal combustion engine is provided with three piston rings comprising two compression rings and one oil-control ring for preventing blowby (leakage of high pressure combustion chamber gases into a crankcase) and for preventing oil from the crankcase from passing into the combustion chamber to be consumed.

On the other hand, pistons with only two compression rings have been recently developed to decrease frictional resistance and weight (by reducing piston size) as disclosed in, for example, U.S. Pat. No. 4,362,136. However, since simply reducing the number of piston rings involves the occurence of blowby and aggravation of oil consumption, special designs in the shapes of the piston rings are proposed as disclosed, for example, in Japanese Utility Model Laid-Open (KOKAI) Nos. 59-126158 59-65958.

A top ring, one of the compression rings positioned toward a piston head, disclosed in Japanese Utility Model Laid-Open No. 59-126158 has the following two facing ends: one end has a protrusion extending at a corner in the outer periphery of the ring and closer to the combustion chamber, while the other end has a recess facing the protrusion and receiving the same when the ring is placed in a ring groove. However, such a piston ring has the disadvantages that manufacturing, costs are increased because of the complicated shape of the facing ends and that the protrusion could easily be damaged because of its small sectional area and therefore low stiffness and because of a strength decrease of the top ring resulting from direct exposure to high-temperature combustion gases.

Also, a piston disclosed in Japanese Utility Model Laid-Open No. 59-65958 has top and second piston rings of a usual rectangular section. A through hole is formed in the piston to communicate a space defined between the top and second rings to the backside of the piston, i.e. to the crankcase side, when the top ring abuts against an upper surface of its ring groove.

However, in the above discussed prior art arrangements no consideration is given to the behaviors of the piston rings relative to the reciprocating movement of the piston. Taking into consideration the behaviors of the piston rings, which change according to operating conditions of the engine, as discussed hereinbelow, these pistons are found still unsatisfactory to reduce oil consumption.

Experiments by the present inventors have revealed that the behaviors of the piston rings relative to the up-and-down movement of the piston are quite different from what is conventionally believed, and the movement of the rings change according to number of revolutions and loaded conditions of the engine.

The behaviors of the piston rings have heretofore been considered to be controlled generally by the friction force along an inner wall of the cylinder and the inertia force of the piston rings so as to follow belatedly the up-and-down movement of the piston. In other words, it has been believed that the piston rings abut against lower surfaces (the surfaces farther from the piston head) of ring grooves when the piston moves upward, and against upper surfaces thereof (the surfaces closer to the piston head) when the piston moves downward. However, since negative pressure acts on the piston rings during the intake stroke, and since combustion pressure acts thereon during the power stroke, the behaviors of the piston rings cannot simply be related to the interaction between the friction and inertia forces. Furthermore, since these pressures vary according to the working conditions of the engine, the behaviors of the piston rings become very complicated.

It is a well known fact that oil consumption is maximum when the engine runs at high speed with high load. Therefore, it is particularly effective if oil consumption can be reduced during such an operating condition.

The present inventors have found that positively leading the high combustion pressure during the power stroke into a space defined by the top and second rings, the inner surface of the cylinder and the outer periphery of the piston (hereinafter referred to as "second land clearance") is very effective in reducing oil consumption. However, in the piston disclosed in the above Japanese Utility Model Laid-Open No. 59-65958, even if the combustion pressure could be introduced into the second land clearance by, for example, providing a passage for communicating the combustion chamber to the second land clearance, the pressure would be released to the crankcase via the through hole, resulting in a failure to increase the pressure in the second land clearance.

The experiments have further revealed that the more the pressure in the second land clearance increases, the lower will be the amount of oil consumption when the engine runs at high speed with high load. On the contrary, with high pressure in the second land clearance, the oil consumption increases when the engine runs at low speed with small load, that is, when a negative pressure is large during deceleration and idling.

SUMMARY OF THE INVENTION

The present invention has been accomplished in view of the problems as discussed above, and it is therefore an object of the present invention to provide a reciprocating piston engine in which oil consumption can be reduced sufficiently by taking into consideration behaviors of piston rings which vary according to operating conditions of the engine.

Another object of the present invention is to provide a piston engine the piston rings of which have high reliability and simple structure.

According to the invention, a reciprocating piston engine includes a piston mounted for reciprocal movement within a cylinder and having a piston head and a piston skirt. Formed on the outer peripheral wall of the piston are a top ring groove at a position closer to the piston head and a second ring groove at a position closer to the piston skirt. Slidably received in the top and second ring grooves are a top ring and a second ring, respectively, which abut at the outer peripheries thereof against the inner wall of the cylinder. The top ring has two end surfaces defining a gap therebetween. An open area formed by the gap on the side of the combustion chamber, when the top ring abuts against the upper surface (on the side of the piston head) of the top ring groove, is smaller than an open area of the gap facing an annular clearance which is defined by both rings, the inner wall of the cylinder and the outer peripheral wall of the piston, when the top ring seats on the lower surface (on the side of the piston skirt) of the top ring groove.

When the engine is operated at a high-speed and high-loaded condition, the top ring seats on the lower surface of the top ring groove during the power stroke. Since the open area of the gap is greater at the side of the annular clearance than at the side of the combustion chamber, combustion pressure may be rapidly introduced into the annular clearance and therefore oil consumption can be reduced. On the other hand, the top ring abuts against the upper surface of the top ring groove during the intake and compression strokes when the engine works at low-speed and low-loaded condition. In such a case, the smaller open area of the gap at the side of the combustion chamber increases resistance to the flow of oil from a crankcase to the combustion chamber, thereby reducing the amount of oil flow. Thus, the total oil consumption can be reduced.

In a preferred embodiment of the invention, the second ring also has two end surfaces defining a gap therebetween. One end surface has a protrusion formed at a position adjacent to the outer periphery and the upper surface (on the side of the piston head) of the second ring, while the other end surface has a recess for receiving the protrusion. The joint plane between the protrusion and recess extends, in cross section of the second ring, between two edges, one of which is located on the upper surface of the second ring at a position within the second ring groove, and the other of which is located on the outer periphery of the second ring at a vertically middle part thereof.

When the combustion pressure is introduced into the annular clearance through the top ring, the second ring abuts against the upper surface of the second ring groove. Thus, the annular clearance is substantially sealed by the protrusion of the second ring, whereby the high pressure in the annular clearance may be maintained.

Other objects, features and advantages of the present invention will be apparent from the following detailed description of preferred embodiments when taken in conjunction with the accompanying drawings.

BRIEF DESCRIPTION OF THE DRAWINGS

FIG. 3 is an enlarged perspective view of the facing end portions of the top ring;

FIGS. 6A and B are perspective views of facing end portions of top rings of other examples;

FIGS. 10A, B and C are views showing still another embodiment of the invention; and FIGS. 11 through 13 are schematic sectional views of further embodiments, respectively, of the invention.

PREFERRED EMBODIMENT DESCRIPTION OF THE INVENTION

Figure 1A:
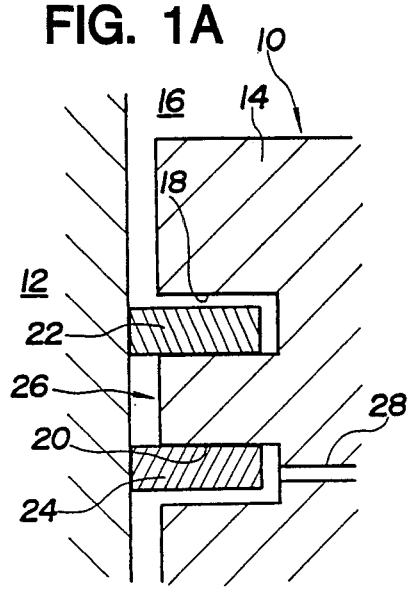
FIG. 1A is a schematic sectional view illustrating a main part of an engine according to a first embodiment of the present invention, during a high-speed, high-loaded engine condition.

Referring first to FIGS. 1 and 2 of the drawings, main parts of an engine, i.e. a piston 10 and a cylinder liner 12, are shown in section. A piston head 14 of the piston 10 and the cylinder liner 12 define a combustion chamber 16, and a crankcase (not shown) is formed below the piston 10. Two ring grooves 18 and 20 spaced by a predetermined distance are formed in the outer peripheral wall of the piston 10, and a top ring 22 closer to the piston head 14 and a second ring 24 closer to a piston skirt (not shown) are received in these ring grooves 18 and 20. The outer peripheries of these piston rings 22 and 24 abut against the inner wall of the cylinder liner 12 and are adapted to slide thereon with the up-and-down movement of the piston 10. These basic structures of the reciprocating piston engine are substantially the same as that of the conventional engines having two piston rings.

According to the invention, the top ring 22 has two facing ends to define a gap 22a therebetween, as shown in FIG. 3. The gap 22a is formed so that the area of gap 22a on the side of the combustion chamber 16 is smaller than that on the side of an annular second land clearance 26 which is defined by the top and second rings 22 and 24, the inner wall of cylinder liner 12 and the outer wall of piston 10. More specifically, the lower portion of each end surface of the top ring 22 in this embodiment is chamfered or cut away to thereby widen the gap 22a downward. That is, the width C1 at the upper end, i.e. at the side of the piston head, of gap 22a is narrower than the width C2 at the lower end, i.e. at the side of the piston skirt.

An oil drain hole 28 is formed in the piston 10, which is opened at one end to the bottom of the second ring groove 20 and at the other end (not shown) to the crankcase.

Figure 4:
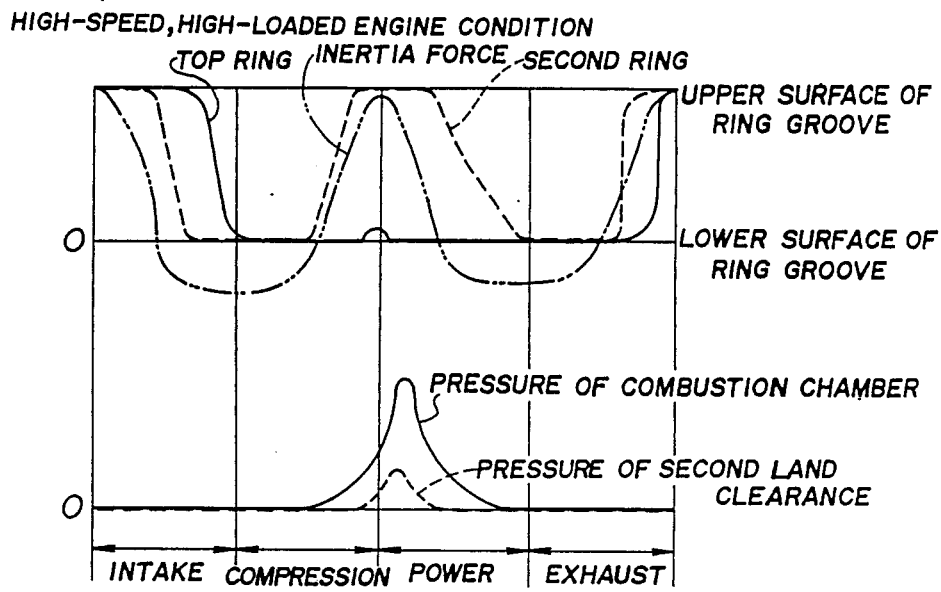
FIG. 4 is a graph showing behaviors of piston rings and pressures in a combustion chamber and a second land clearance in the high-speed, high-loaded engine condition.

The piston engine of the present invention operates as follows. First, behaviors of the piston rings 22 and 24 during one cycle of the engine are shown, when the engine runs at high speed with high load, in FIG. 4 which also shows pressure changes in the combustion chamber 16 and the second land clearance 26. In such working condition of the engine, since the intake negative pressure is small, there is almost no pressure drop in the combustion chamber 16 and the second land clearance 26 during the intake and compression strokes, unlike the low-speed, low-loaded engine condition, so that the piston rings 22 and 24 are influenced strongly by the inertia force which is indicated by a long and two short dash line in FIG. 4. Accordingly, the top ring 22 abuts against the upper surface of the ring groove 18 until about two thirds of the intake stroke, and thereafter it moves gradually toward the lower surface of groove 18 and seats thereon at bottom dead center of the piston 10. Although the direction of the inertia force changes during the compression stroke, this does not cause the top ring 22 to immediately move toward the upper surface. The top ring 22 moves a little distance away from the lower surface when the piston 10 nears its top dead center, and the ring is caused to seat on the lower surface again by the combustion pressure during the power stroke. The influence of the combustion pressure continues effective till the end of the exhaust stroke, and thereafter the top ring 22 moves to the upper surface of the ring groove 18 by the inertia force.

On the other hand, the second ring 24, which is not influenced as much by the combustion pressure as the top ring 22, abuts against is the upper surface of the ring groove 20 by the inertia force from the last stage of the compression stroke through the first half of the power stroke.

Figure 1B:
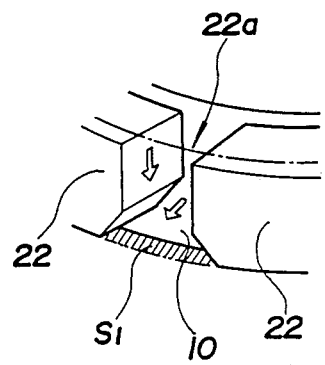
FIG. 1B is a perspective view illustrating facing end portions of a top ring in FIG. 1A.

Thus, at the initial stage of the power stroke, the top ring 22 seats on the lower surface of the ring groove 18 while the second ring 24 abuts against the upper surface of the ring groove 20, as shown in FIG. 1A. It may be understood that, in leading the combustion pressure into the second land clearance 26, an area of inlet for the combustion gas to the clearance 26 is important, which inlet is constituted by the lower end of gap 22a of the top ring 22 and is defined by the lower surface of ring groove 18. Since in this embodiment the gap 22a widens downward and the inlet to the clearance 26 has an area S1 indicated as a shaded portion in FIG. 1B, resistance to the flow of gas is so small that a large amount of high pressure gases can flow into the second land clearance 26 to thereby rapidly raise the pressure therein. Thus, the high pressured second land clearance 26 is provided halfway in the oil passage from the crankcase to the combustion chamber, whereby oil consumption is extremely reduced especially in the high-speed, high-loaded engine condition in which the largest amount of oil is consumed.

Figure 5:
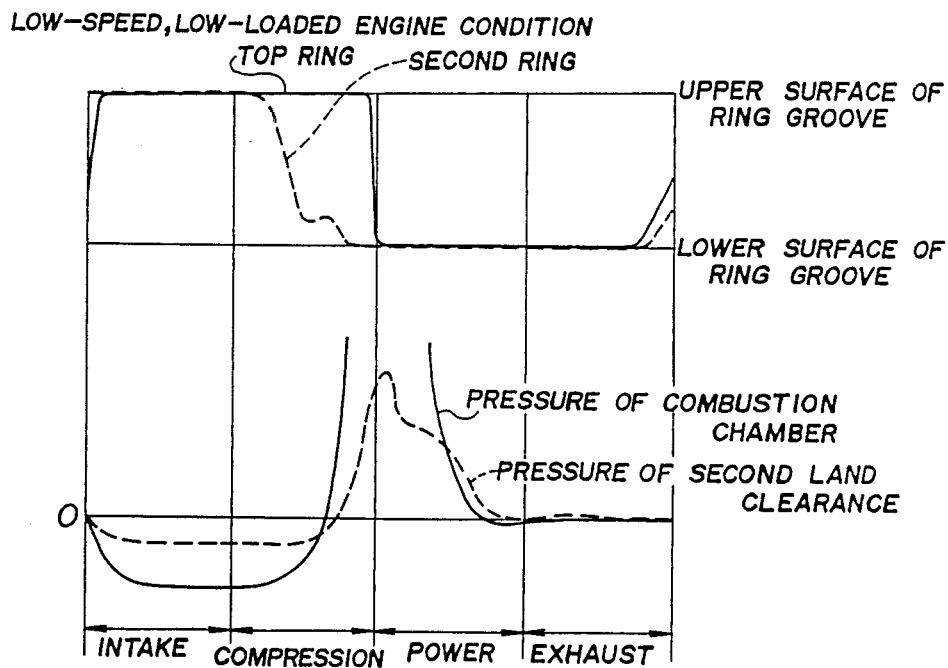
FIG. 5 is a graph similar to FIG. 4 but in the low-speed, low-loaded engine condition.
Figure 7:
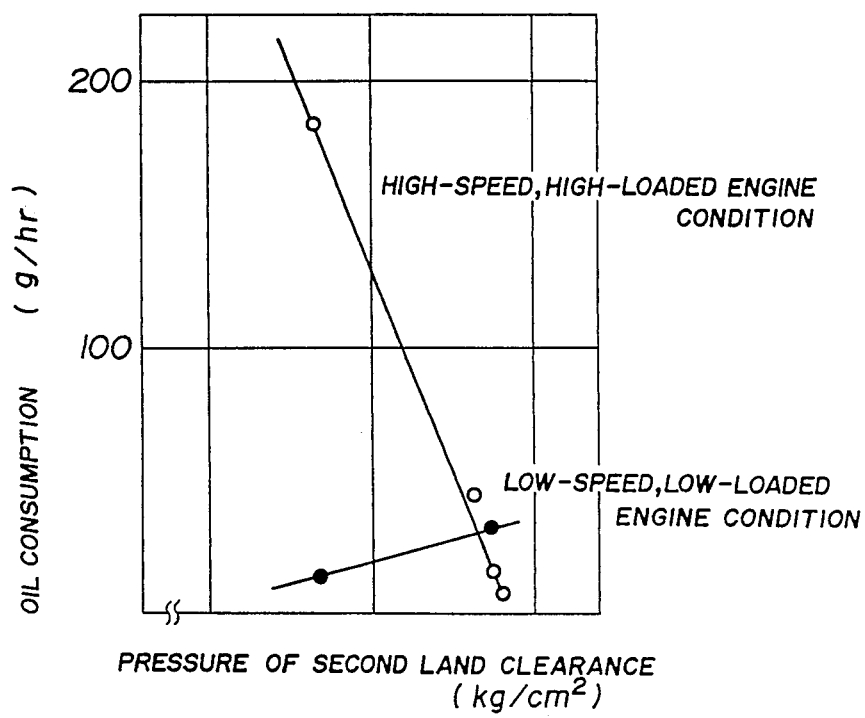
FIG. 7 is a graph showing a relationship between oil consumption and pressure in the second land clearance.

Next, FIG. 5 shows behaviors of the top and second rings 22 and 24 as well as the pressures in the combustion chamber 16 and the second land clearance 26 during one cycle in the low-speed, low-loaded engine condition. It is to be noted that the pressure changes are illustrated at FIG. 5 in a larger scale than in FIG. 4 for ease of explanation. Since in such working condition the intake valve (throttle valve in a gasoline engine, and intake shutter valve in a diesel engine) is shut unlike the high-speed, high-loaded engine condition, a relatively high negative pressure is produced in the combustion chamber 16 during the intake and compression strokes so that the top ring 22 abuts against the upper surface of the ring groove 18 during almost the entire intake stroke. At the last stage of the compression stroke, the top ring 22 quickly moves downward to approach the lower surface of the ring groove 18. During the power stroke the top ring 22 continues abutting against the lower surface by the pressure from the combustion chamber 16, and it moves toward the upper surface at the last stage of the exhaust stroke. On the other hand, the second ring 24, which is not influenced as much by the negative pressure as is the top ring 22, moves to the lower surface of the ring groove 20 at an earlier stage than the top ring 22 during the compression stroke. The pressure in the second land clearance 26 does not drop so much as, and becomes higher than, that in the combustion chamber 16.

Figure 2A:
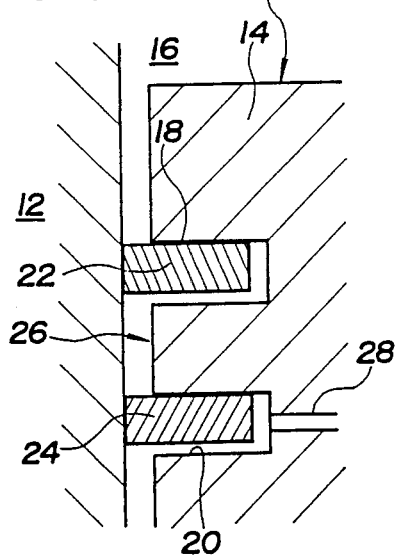
FIG. 2A is a schematic sectional view similar to FIG. 1A but in a low-speed, low-loaded engine condition.
Figure 2B:
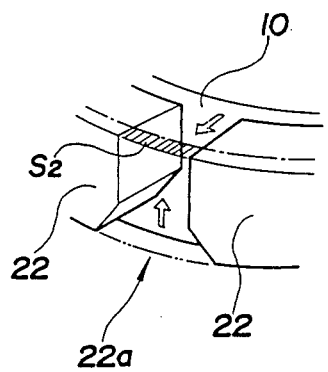
FIG. 2B is a perspective view illustrating the facing end portions of the top ring in FIG. 2B.

Accordingly, at the intake and compression strokes during which the pressure in the combustion chamber 16 drops, both the top and second rings 22 and 24 abut against the upper surface of the ring grooves 18 and 20 as shown in FIG. 2A. An outlet for oil, constituted by the upper end of gap 22a and defined by the upper surface of ring groove 18, from the second land clearance 26 to the combustion chamber 16, has an area S2 (FIG. 2B) which is smaller than the area S1 to thereby create a large resistance to the flow of oil. Therefore, when the oil is sucked up by the negative pressure in the combustion chamber 16, the top ring 22 provides only a small flow path for oil and reduces oil consumption also in the low-loaded, low-speed engine condition.

It is to be noted here that the shape of the gap is not limited to the above structure. For example, a top ring 122 illustrated in FIG. 6A has two facing end surfaces of which lower portions are rectangularly recessed at 123 to form a stepped gap 122a therebetween. Also, end surfaces of a top ring 222 in FIG. 6B are inclined so as to diverge from each other toward the lower ends, defining a gradually widening gap 222a.

A second embodiment of the present invention will be described hereinafter with reference to FIG. 8 in which the same structures as in the first embodiment are designated by the same reference numerals. A piston 30 in this embodiment also has the ring grooves 18 and 20 for receiving respectively a top ring 42 and a second ring 44. An oil drain hole 48 is formed in the piston 30 and is opened at a position below the ring groove 20. The top ring 42 is provided with passages 50 which open at one end into a space 52 defined between the bottom of ring groove 18 and the inner wall of top ring 42 and at the other end into the second land clearance 26 when the top ring 42 seats on the lower surface of the ring groove 18. The passages 50 are constituted by recesses formed on the lower surface of the top ring at predetermined intervals along the circumferential direction, and are intended to lead the high combustion pressure from the combustion chamber 16 into the second land clearance 26 during the high-speed, high-loaded engine condition.

Figure 8A:
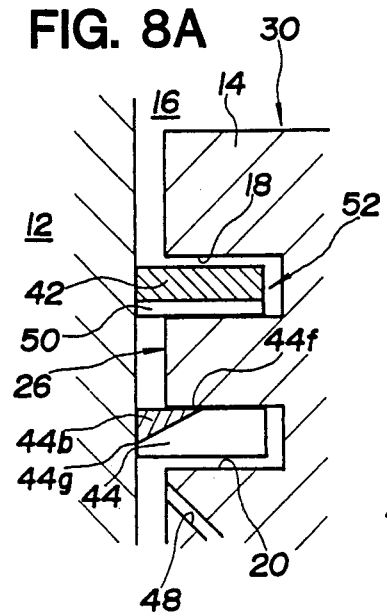
FIG. 8A is a schematic sectional view illustrating a main part of an engine according to a second embodiment of the present invention.
Figure 8B:
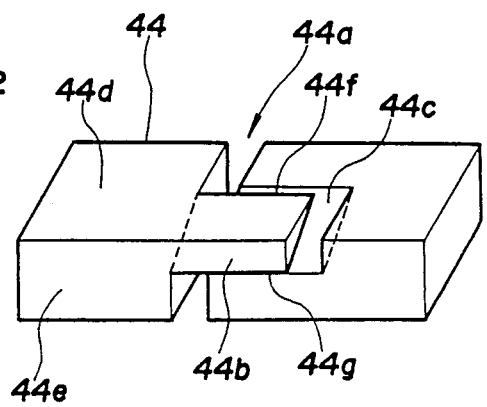
FIG. 8B is an enlarged perspective view illustrating facing end portions of a second ring.

The second ring 44 in this embodiment has two facing end surfaces to define a gap 44a therebetween, as illustrated in FIG. 8B. Thus, one end surface has a protrusion 44b having a triangular cross section and extending across the gap 44a to the other end where it is received within a beveled recess 44c. The protrusion and recess may have other shapes, if desired. The protrusion 44b is formed at an upper corner (closer to the piston head 14) in the outer periphery 44e (closer to the cylinder liner 12) of the second ring 44. As seen from FIG. 8, one edge 44f of the joint plane between the protrusion 44b and recess 44c is situated at the radially middle part of the upper surface 44d of the second ring 44 where the upper surface 44d is in contact with the upper surface of the ring groove 20, and the other edge 44g is situated in the vertically middle part of the outer periphery 44e of the second ring 44.

In the high-speed, high-loaded engine condition as described above with reference to FIG. 4, at the initial stage of the power stroke the top ring 42 seats on the lower surface of groove 18 while the second ring 44 abuts against the upper surface of groove 20, as shown in FIG. 8A. Accordingly, the second land clearance 26 is communicated with the combustion chamber 16 through the passages 50, whereby the high pressure in the chamber 16 is introduced into the clearance 26 to increase the pressure of the latter. At this moment, one edge 44f of the joint plane between the protrusion 44b and the recess 44c abuts against the upper surface of ring groove 20, and the other edge 44g thereof abuts against the inner wall of cylinder liner 12. Therefore, the second land clearance 26 can be maintained in the high pressured state, which improves oil consumption as discussed hereinbefore.

Figure 9A:
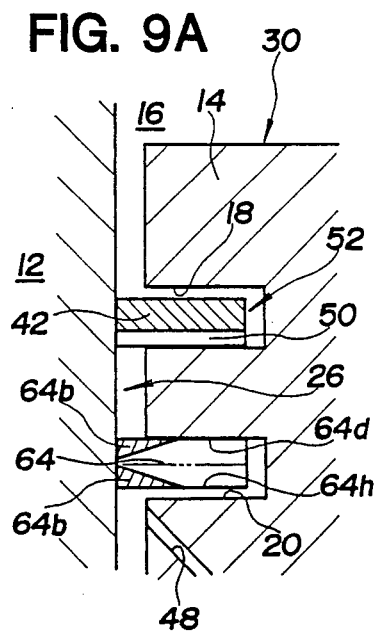
FIGS. 9A and B are schematic sectional views of a main part of an engine according to another embodiment of the present invention.
Figure 9B:
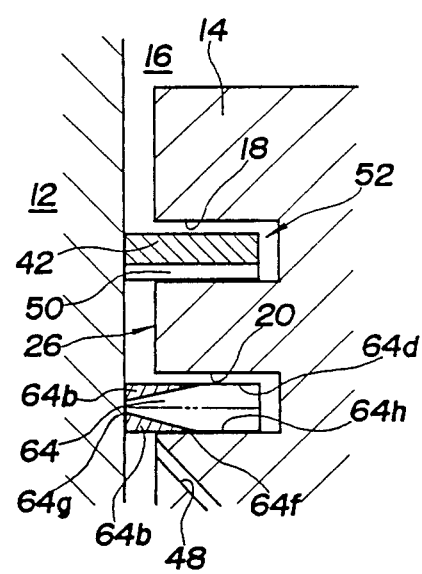

FIG. 9 illustrates another embodiment of a second ring. In the second ring 64 of this embodiment, protrusion-recess structures are formed both in the upper and lower sides of the second ring 64. That is, in addition to a protrusion 64b which is substantially identical to the above protrusion 44b, another protrusion 64b is formed at a lower corner in the outer periphery of the second ring 64. Corresponding recesses are also formed in the upper and lower surfaces 64d and 64h of the second ring 64. If desired, this second ring 64 may be formed by jointing a pair of halves, each having one protrusion-recess structure, with one in a reverse orientation as indicated by dash and dot lines in FIGS. 9A and 9B.

This second ring 64 can also prevent the release of high pressure from the second land clearance 26 in the high-speed, high-loaded condition of the engine. Additionally, it may provide the following functions when the engine is operated at low-speed and under low-loaded condition. Thus, in such an operating condition, throughout the power stroke the top ring 42 seats on the lower surface of groove 18 due the high combustion pressure while the second ring 64 abuts against the upper surface of groove 20, as described hereinabove with reference to FIG. 5. As a result, the combustion gas flows into the second land clearance through the passages 50. At this moment, as seen from FIG. 9B, one edge 64f of the joint plane between the protrusion 64b and recess 64c formed in the lower surface 64h of the second ring 64 abuts against the lower surface of the ring groove 20 and the other edge 64g abuts against the inner wall of the cylinder liner 12 to substantially seal the second land clearance 26 so that the gas is prevented from flowing into the crankcase. Accordingly, the amount of blowby can be drastically reduced in the low-speed, low-loaded engine condition.

It will be understood that various combinations of the above top and second rings are of course possible to achieve combined effects. An example of FIG. 10 has the top ring 22 in the first embodiment and the second ring 44 in the second embodiment. Also, an example of FIG. 11 is a combination of the top ring 22 in the first embodiment and the second ring 64 in the third embodiment.

Figure 12:
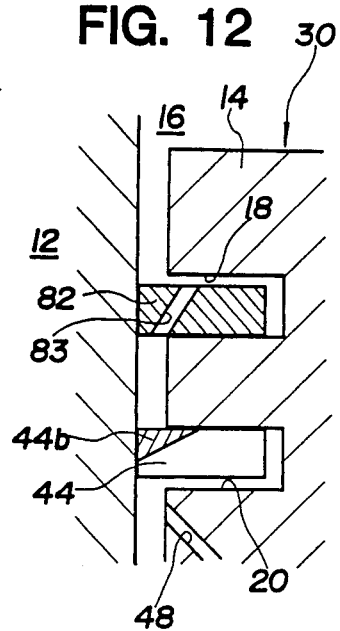
Figure 13:
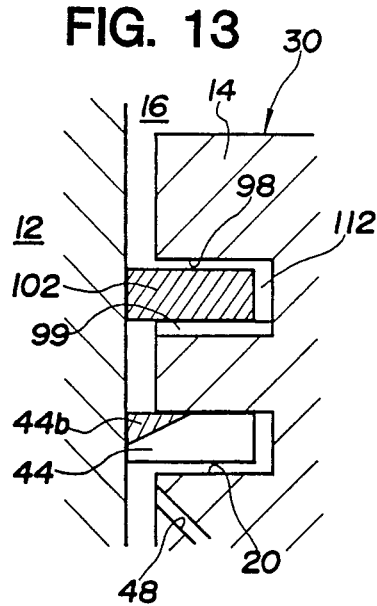

Further, when the second ring 44 or 64 in the second or third embodiment is used, various passages may be formed in connection with the top ring. In FIG. 12, the top ring 82 is provided with through holes 83 which are inclined outwardly toward the lower end in such a manner that these holes communicate the combustion chamber 16 with the second land clearance 26 when the top ring 82 seats on the lower surface of groove 18. In FIG. 13, the ring groove 98 for receiving the top ring 102 is provided at its lower surface with notches 99 which, in cooperation with the bottom space 112, permit the combustion gas to flow into the second land clearance 26 when the top ring 102 seats on the lower surface of groove 98.

The second ring is, differently from the top ring, not directly exposed to the combustion gas and the temperature in the second ring groove is lower than that in the top ring groove. Therefore, the second ring is less influenced by the heat than is the top ring, so that any decrease in strength of the protrusion will be negligible and sufficient reliability of the second ring will be maintained.

Although the present invention has been described with reference to the preferred embodiments thereof, many modifications and alterations may be made within the spirit of the invention.

What is claimed is:

1. A reciprocating piston engine comprising:
   a piston mounted for reciprocal movement within a cylinder, said piston having a piston head and a piston skirt;
   a top ring groove formed on the outer peripheral wall of said piston at a position closer to said piston head;
   a second ring groove formed on the outer peripheral wall of said piston at a position closer to said piston skirt;
   a top ring slidably received in said top ring groove and abutting at the outer periphery thereof against the inner wall of said cylinder, said top ring including an upper surface located on the side of said piston head, a lower surface on the side of said piston skirt and two end surfaces defining a gap therebetween, said end surfaces being inclined in such a manner that a circumferential width of said gap is increased toward the lower end and that the upper end of said gap is circumferentially positioned within the lower end thereof, whereby an open area formed by said gap when said top ring abuts against the upper surface of said top ring groove and facing the combustion chamber is smaller than an open area of said gap when said top ring seats on the lower surface of said top ring groove and facing an annular clearance defined by both said rings, the inner wall of said cylinder and the outer peripheral wall of said piston; and
   a second ring slidably received in said second ring groove and abutting at the outer periphery thereof against the inner wall of said cylinder.

2. A reciprocating piston engine as claimed in claim 1, wherein said second ring includes an upper surface on the side of said piston head, a lower surface on the side of said piston skirt and two end surfaces defining a gap therebetween, one end surface has a protrusion extending across said gap from a corner between the outer periphery and said upper surface, and other end surface has a recess for receiving said protrusion, a joint plane between said protrusion and said recess extending in a cross section of said second ring between two edges, one of which is located on said upper surface at a position within said second ring groove and the other of which is located on the outer periphery at the vertically middle part thereof.

3. A reciprocating piston engine as claimed in claim 2, wherein at least one of said top ring and said top ring groove has formed therein a plurality of circumferentially spaced passages for communicating the combustion chamber to said annular clearance when said top ring seats on the lower surface of said top ring groove.

4. A reciprocating piston engine comprising:

a piston mounted for reciprocal movement within a cylinder, said piston having a piston head and a piston skirt;

a top ring groove formed on the outer peripheral wall of said piston at a position closer to said piston head;

a second ring groove formed on the outer peripheral wall of said piston at a position closer to said piston skirt;

a top ring slidably received in said top ring groove and abutting at the outer periphery thereof against the inner wall of said cylinder, said top ring having two end surfaces defining a first gap therebetween, an open area formed by said first gap on the side of the combustion chamber when said top ring abuts against the upper surface of said top ring groove being smaller than an open area of said first gap facing an annular clearance defined by both said rings, the inner wall of said cylinder and the outer peripheral wall of said piston when said top ring seats on the lower surface of said top ring groove; and a second ring slidably received in said second ring groove and abutting at the outer periphery thereof against the inner wall of said cylinder, said second ring having two end surfaces defining a second gap therebetween for communicating said annular clearance with the crankcase of the engine, one end surface having a protrusion formed at a position adjacent to the outer periphery of said second ring and on the side of said piston head, and other end surface having a recess for receiving said protrusion, a joint plane between said protrusion and said recess extending in a cross section of said second ring between two edges, one of which is located on the upper surface of said second ring and at a position within said second ring groove, and the other of which is located on the outer periphery of said second ring at a vertically middle part thereof, whereby said second gap has a smaller open area when said second ring abuts against the upper surface of said second ring groove and a larger open area when said second ring seats on the lower surface of said second ring groove;

said top ring and said second ring seating on the lower surfaces of said top ring groove and said second ring groove, respectively, during a power stroke in a low-speed and low-loaded engine operation.

5. A reciprocating piston engine comprising:

a piston mounted for reciprocal movement within a cylinder, said piston having a piston head and a piston skirt;

a top ring groove formed on the outer peripheral wall of said piston at a position closer to said piston head;

a second ring groove formed on the outer peripheral wall of said piston at a position closer to said piston skirt;

a top ring slidably received in said top ring groove and abutting at the outer periphery thereof against the inner wall of said cylinder, said top ring having two end surfaces defining a gap therebetween, said top ring seating on the lower surface of said top ring groove at least during a power stroke of the engine, and said top ring abutting against the upper surface of said top ring groove at least during intake and compression strokes in a low-speed and low-loaded engine operation;

a second ring slidably received in said second ring groove and abutting at the outer periphery thereof against the inner wall of said cylinder, said second ring seating on the lower surface of said second ring groove at least during a power stroke in a low-speed and low-loaded engine operation and abutting against the upper surface of said second ring groove at least during a power stroke in a high-speed and high-loaded engine operation;

said top ring and said second ring defining an annular clearance therebetween in cooperation with the inner wall of said cylinder and the outer wall of said piston;

a first passage for communicating said annular clearance with a combustion chamber of the engine, said first passage being formed by said gap of said top ring and defined by the inner wall of said cylinder and one of the upper and lower surfaces of said top ring groove, and said first passage providing a larger open area for a flow from the combustion chamber to said annular clearance when said top ring seats on the lower surface of said top ring groove, and a smaller open area for a flow from said annular clearance to the combustion chamber when said top ring abuts against the upper surface of said top ring groove; and a second passage for communicating said annular clearance with the crankcase of the engine, said second passage being formed in said second ring and defined by the inner wall of said cylinder and one of the upper and lower surfaces of said second ring groove, said second passage having an area smaller than the area of said first passage when said second and top rings abut against the upper surfaces of said second and top ring grooves, respectively, wherein said annular clearance is maintained at a high pressure in the high-speed and high-loaded engine operation, and said second passage having a smaller area when said second ring abuts against the upper surface of said second ring groove and a larger area when said second ring seats on the lower surface of said second ring groove.

6. A reciprocating piston engine comprising:

a piston mounted for reciprocal movement within a cylinder, said piston having a piston head and a piston skirt;

a top ring groove formed on the outer peripheral wall of said piston at a position closer to said piston head;

a second ring groove formed on the outer peripheral wall of said piston at a position closer to said piston skirt;

a top ring slidably received in said top ring groove and abutting at the outer periphery thereof against the inner wall of said cylinder, said top ring having two end surfaces defining a gap therebetween, a circumferential width of said gap on the side of said piston head being smaller than a circumferential width thereof on the side of said piston skirt, whereby an open area formed by said gap on the side of the combustion chamber when said top ring abuts against the surface of said top ring groove at the side of said piston head is smaller than an open area of said gap facing an annular clearance defined by both said rings, the inner wall of said cylinder and the outer peripheral wall of said piston when said top ring seats on the surface of said top ring groove at the side of said piston skirt; and a second ring slidably received in said second ring groove and abutting at the outer periphery thereof against the inner wall of said cylinder.

7. A reciprocating piston engine as claimed in claim 6, wherein said second ring has two end surfaces defining a gap therebetween, one end surface has a protrusion formed at a position adjacent to the outer periphery of said second ring and on the side of said piston head, and other end surface has a recess for receiving said protrusion, a joint plane between said protrusion and said recess extending in a cross section of said second ring between two edges, one of which is located on the surface of said second ring on the side of said piston head and at a position within said second ring groove, and the other of which is located on the outer periphery of said second ring at a vertically middle part thereof, whereby an open area formed by said gap of said second ring when said second ring abuts against the surface of said second ring groove at the side of said annular clearance is smaller than an open area of said gap when said second ring abuts against the surface of said second ring groove at the side of the crankcase of the engine.

8. A reciprocating piston engine as claimed in claim 6, wherein said second ring has two end surfaces defining a gap therebetween, one end surface has first and second protrusions formed at positions adjacent to the outer periphery of said second ring, said first protrusion being on the side of said piston head while said second protrusion is on the side of said piston skirt, and other end surface has first and second recesses for receiving said first and second protrusions, respectively.

9. A reciprocating piston engine as claimed in claim 8, wherein a joint plane between said first protrusion and said first recess extends in a cross section of said second ring between two edges, one of which is located on the surface of said second ring on the side of said piston head and at a position within said second ring groove, and the other of which is located on the outer periphery of said second ring at the vertically middle part thereof, and wherein one edge of a joint plane between said second protrusion and said second recess is located on the surface of said second ring on the side of said piston skirt and at a position within said second ring groove, and the other edge is located on the outer periphery of said second ring at the vertically middle part thereof.

10. A reciprocating piston engine as claimed in claim 9, wherein said second ring is formed by joining two axially divided halves each having one of said protrusions and one of said recesses.

11. A reciprocating piston engine as claimed in claim 6, wherein the end portion of said gap on the side of said piston head is located at a position within the circumferential dimension of the end portion of said gap on the side of said piston skirt when viewed in the axial direction of said top ring.

12. A reciprocating piston engine as claimed in claim 11, wherein said end surfaces of said top ring are inclined to thereby widen said gap gradually toward the end portion on the side of said piston skirt.

13. A reciprocating piston engine as claimed in claim 11, wherein said end surfaces of said top ring have first portions on the side of said piston head and second portions on the side of said piston skirt, said first portions being parallel to each other and to the center axis of said top ring, and said second portions being continuous with said first portion and diverging from each other.

14. A reciprocating piston engine as claimed in claim 11, wherein said second ring has two end surfaces defining a gap therebetween, one end surface has a protrusion formed at a position adjacent to the outer periphery of said second ring and on the side of said piston head, and other end surface has a recess for receiving said protrusion, a joint plane between said protrusion and said recess extending in a cross section of said second ring between two edges, one of which is located on the surface of said second ring on the side of said piston head and at a position within said second ring groove, and the other of which is located on the outer periphery of said second ring at the vertically middle part thereof.

15. A reciprocating piston engine as claimed in claim 14, wherein said one end surface of said second ring has an additional protrusion formed at a position adjacent to said outer periphery and on the side of said piston skirt, and said other end surface has an additional recess for receiving said additional protrusion, one edge of a joint plane between said additional protrusion and recess being located on the surface of said second ring on the side of said piston skirt and at a position within said second ring groove, and the other edge being located on the outer periphery of said second ring at the vertically middle part thereof, and wherein said second ring is formed by joining two axially divided halves each having one of said protrusions and one of said recesses.

* * * * *